Aug. 7, 1956   J. D. CRABBE ET AL   2,757,709
CONVEYOR BELTING AND METHOD OF MAKING SAME
Filed Jan. 13, 1954
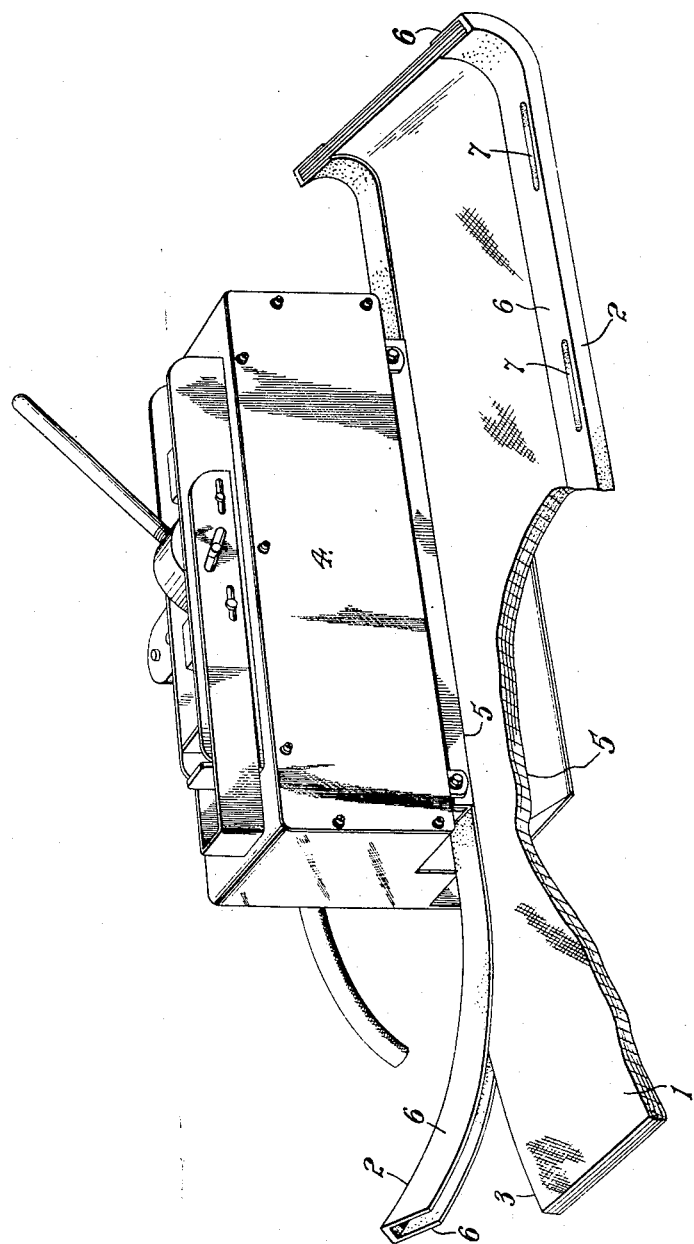
INVENTORS
John Douglas Crabbe
Fredrick William Warren
by Benj. T. Rauber
their attorney

United States Patent Office 2,757,709
Patented Aug. 7, 1956

2,757,709

CONVEYOR BELTING AND METHOD OF MAKING SAME

John Douglas Crabbe, Liverpool, and Fredrick William Warren, Wilmslow, England, assignors to Dunlop Rubber Company Limited, London County, England, a British company Application January 13, 1954, Serial No. 403,838

3 Claims. (Cl. 154—4)

This invention relates to belting and in particular conveyor belting.

It is known to form such belting from fabric and vulcanised rubber but where the belting is used in places where the risk of fire is great, for example coal mines, the inflammable nature of the rubber proves to be a source of danger.

It has been proposed to form belting from fabric and a non-inflammable thermoplastic material such as polyvinyl chloride. Difficulty however has been experienced in that the flow of the thermoplastic material is uneven, producing ragged edges to the belting. Furthermore, surfaces of the thermoplastic material do not adhere together in the cold and the coated fabric plies of the built-up belting are therefore free to move with respect to each other before fusion of the material.

Our invention provides belting comprising a thermoplastic material having clean and square edges and an improved method for the manufacture of such belting in which interply movement does not take place when the assembly of plies is cold prior to fusion of the thermoplastic material.

According to our invention a method of making belting comprises applying U-shaped strips of thermoplastic material to the edges of a belting assembly comprising one or more lengths of fabric coated with a thermoplastic material so that the arms of the U-shaped strips embrace the outer surfaces of the assembly, fusing the thermoplastic material of the strips and the adjacent portions of the surfaces along the belting edges and then fusing and setting the assembly and strips under pressure.

When the thermoplastic material is suitable the fusion of the edges is preferably performed by radio-frequency heating.

A preferred method of producing multiply conveyor belting according to the invention will now be more particularly described with reference to the accompanying drawing which shows a cut-away perspective view of a portion of belting structure and the application of edge strips thereto.

A plurality of lengths of fabric coated on both faces with a polyvinyl chloride composition which can be fused by heating are assembled to form a multi-ply belting structure 1. The outer plies are built up on their outer surfaces with a topping coat of the composition of approximately 3/64" thickness.

A length of U-section strip 2 made of the polyvinyl chloride composition is then applied to each edge 3 of the belting structure so that the arms 6 of the strip embrace the portions of the outer surface of the outer plies adjacent their edges.

A radio-frequency heating unit 4 is placed with the heating jaws 5 thereof gripping the arms of a length of strip and the unit is then set in operation to fuse the composition and thus unite the strip and the adjacent portions of the belting plies. The operation is repeated along the lengths of both edges of the belting to form short welds 7.

The belting can now be handled without danger of any relative movement between the plies and is subjected to heat and pressure to effect adhesion between the plies and convert the assembly into a unitary structure.

The manufacture of the belting may be carried out by drawing lengths of coated fabric from supply drums, assembling the plies, uniting the edges as described above, subjecting the assembly to heat and pressure between heated platens to fuse the composition and effect adhesion between the plies and then cooling the assembly to effect setting.

Alternatively the final stages of manufacture after the strips have been applied may be effected in a continuous operation, for instance as described in our co-pending application Serial No. 404,653, filed January 18, 1954.

Having described our invention what we claim is:

1. A method of making belting comprising applying U-shaped strips of a polyvinyl chloride composition to the edges of a belting assembly comprising at least one ply of textile fabric coated with a polyvinyl chloride composition so that the arms of the U-shaped strips embrace the outer surfaces of the assembly, fusing the strips to the adjacent portions of the belting surfaces at intervals along the belting assembly edges by radio-frequency heating, and then fusing and setting the assembly and strips under pressure.

2. Belting comprising an assembly of at least one ply of textile fabric impregnated with a polyvinyl chloride composition and having U-shaped edge strips of a polyvinyl chloride composition fused thereto so that the arms of the strips embrace the outer surfaces of the assembly.

3. A method of making belting comprising applying U-shaped strips of a polyvinyl chloride composition to the side edges of a belting assembly of superposed plies comprising at least one ply of textile fabric coated with a polyvinyl chloride composition so that the arms of the U-shaped strips embrace the outer surfaces of the side margins of the belting assembly, fusing the strips to the adjacent portions of the belting surfaces at intervals along the belting assembly edges and then fusing and setting the assembly and strips under pressure.

References Cited in the file of this patent

UNITED STATES PATENTS

| 1,958,033 | Cohn | May 8, 1934 |
| 2,072,095 | Cohn | Mar. 2, 1937 |
| 2,249,514 | Berg | July 15, 1941 |
| 2,554,160 | Von Gunten | May 22, 1951 |
| 2,639,852 | Sanders et al. | May 26, 1953 |
| 2,696,865 | Seiler | Dec. 14, 1954 |

FOREIGN PATENTS

| 555,054 | Great Britain | Aug. 3, 1943 |